United States Patent [19]
Belanger

[11] Patent Number: 5,570,989
[45] Date of Patent: Nov. 5, 1996

[54] RAMP FOR USE ON A PICKUP TRUCK HAVING A BOTTOM HINGED TAILGATE

[76] Inventor: Michael Belanger, 2500 Brookhills Dr., Greenbay, Wis. 54313

[21] Appl. No.: 385,659

[22] Filed: Feb. 8, 1995

[51] Int. Cl.$^6$ ............................................. B65G 67/02
[52] U.S. Cl. ............................................. 414/537; 414/522
[58] Field of Search ...................................... 414/480, 522, 414/537, 532; 296/61

[56] References Cited

U.S. PATENT DOCUMENTS

| | | | |
|---|---|---|---|
| D. 355,518 | 2/1995 | Belanger | D34/32 |
| 3,870,170 | 3/1975 | Noble et al. | 414/537 |
| 4,624,619 | 11/1986 | Uher | 414/537 |
| 4,685,857 | 8/1987 | Goeser et al. | 414/537 X |
| 4,900,217 | 2/1990 | Nelson | 414/537 |
| 4,990,049 | 2/1991 | Hargrove | 414/537 |
| 5,257,894 | 11/1993 | Grant | 414/537 |
| 5,331,701 | 7/1994 | Chase et al. | 414/537 X |
| 5,393,192 | 2/1995 | Hall et al. | 414/537 |

Primary Examiner—James W. Keenam

[57] ABSTRACT

A truck ramp mountable to the upper surface of the cargo portion of a pickup truck that has a bottom hinged tailgate and at least one wheel well having a contour and which includes a fixed portion, a movable portion, an axle, a pair of rollers, a pair of tracks, and a stop. The fixed portion has an upper surface, a lower surface, a longitudinal axis center line, and a back end. The fixed portion is removably mountable to the upper surface of the cargo portion and forms a chamber therebetween. The movable portion is slidably mounted within the chamber and has a retracted position, an extended position, a distal end, an upper surface, and a proximal end that contains a tunnel. The axle has a pair of free ends and is rotatably mounted in the tunnel of the movable portion. Each of the pair of rollers are located at each of the pair of free ends of the axle. The pair of tracks are located between the lower surface of the fixed portion and the upper surface of the cargo portion of the pickup truck and rotatably receive the pair of rollers. The stop is located at the back end of the fixed portion.

9 Claims, 3 Drawing Sheets

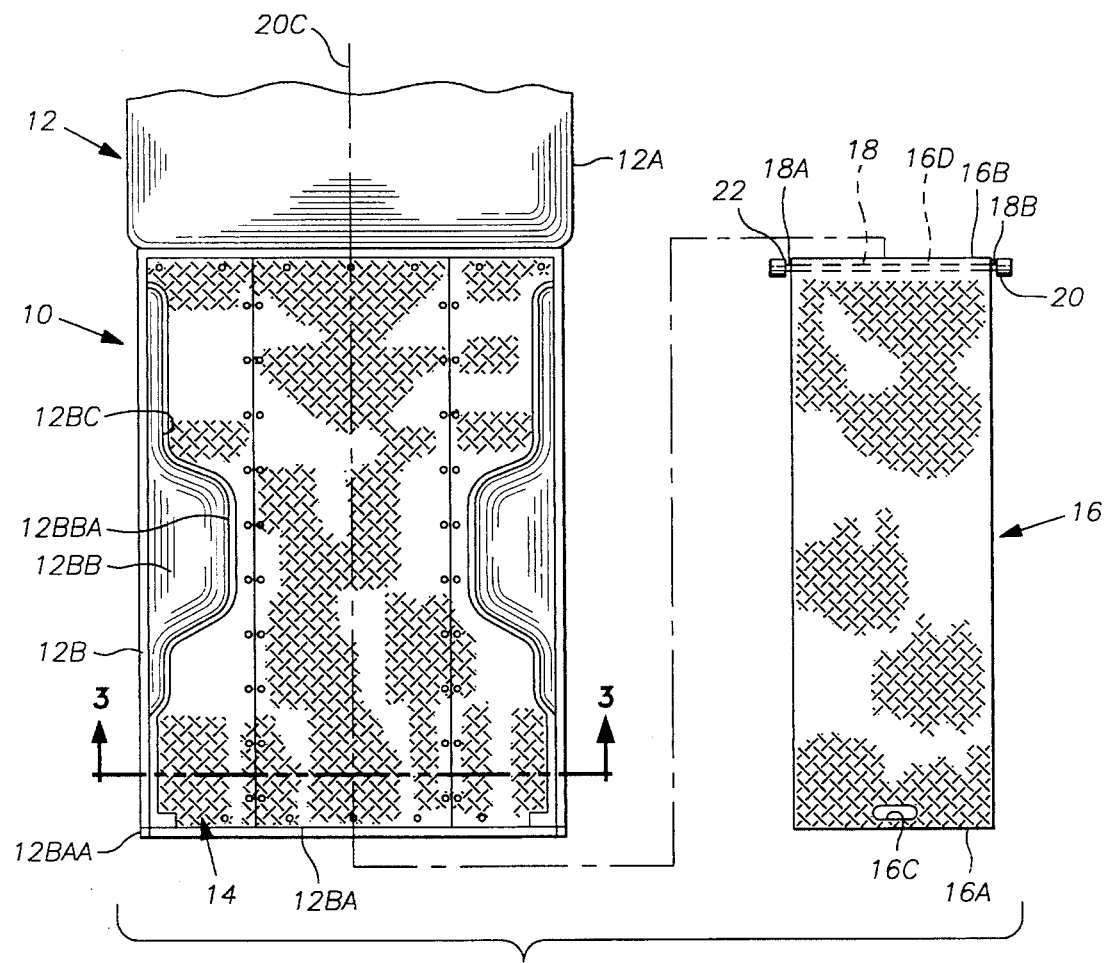
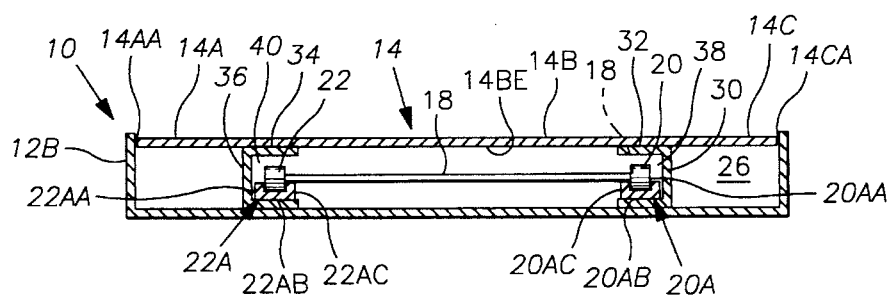

५,५७०,९८९

RAMP FOR USE ON A PICKUP TRUCK HAVING A BOTTOM HINGED TAILGATE

BACKGROUND OF THE INVENTION

1. Field of the Invention

The present invention relates to a truck romp. More particularly, the present invention relates to a ramp for use on a pickup truck having a bottom hinged tailgate.

2. Description of the Prior Art

Numerous innovations for truck ramps have been provided in the prior art that will be described. These ramp structures are mounted within the cargo bay of the pickup truck and require the tailgate for support. However, even though these innovations may be suitable for the specific individual purposes to which they address, they differ from the present invention.

For example, U.S. Pat. No. 3,870,170 to Noble et al. teaches a loading ramp which includes freely sliding tracks that are extended past the rear end of the truck body. The ramp is provided, at its forward end, with a hinged extension flap that is folded rearwardly to lie upon the main body of the ramp when the ramp is not in use. The hinged extension flap is unfolded to bridge the space between the ramp proper and the tailgate of the truck body and rests upon the tailgate when it is open.

Another example, U.S. Pat. No. 4,624,619 to Uher teaches a retractable ramp assembly for pickup trucks which includes a ramp that has front and rear sections that are hinged to each other. The front section has a length equal of the length of the tailgate of the pickup truck. Further, the front section is extended to a position where it rests directly on top of the tailgate when the tailgate is opened.

It is apparent that numerous innovations for truck ramps have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, it is an object of the present invention to provide a truck ramp that avoids the disadvantages of the prior art.

It is another object of the present invention to provide a truck ramp that is simple and inexpensive to manufacture.

It is another object of the present invention to provide a truck ramp that is applicable to a pickup truck having a bottom opening tailgate.

It is another object of the present invention to provide a truck ramp that is readily adaptable to pickup trucks having differently configured cargo bay areas.

It is another object of the present invention to provide a truck ramp whose movable portion is one piece.

It is another object of the present invention to provide a truck ramp that mounts in the cargo bay, above the frame, of a pickup truck.

It is another object of the present invention to provide a truck ramp that is restricted from lateral and longitudinal movement within the cargo bay of a pickup truck without the need for fasteners.

It is another object of the present invention to provide a truck ramp which includes a fixed portion, a movable portion, an axle, a pair of rollers, a pair of tracks, and a stop.

It is another object of the present invention to provide a truck ramp wherein the fixed portion has an upper surface, a lower surface, a longitudinal axis center line, and a back end.

It is another object of the present invention to provide a truck ramp wherein the fixed portion is removably mountable to the upper surface of the cargo portion and forms a chamber therebetween.

It is another object of the present invention to provide a truck ramp wherein the movable portion is slidably mounted within the chamber and has a retracted position, an extended position, a distal end, an upper surface, and a proximal end that contains a tunnel.

It is another object of the present invention to provide a truck ramp wherein the axle has a pair of free ends and is rotatably mounted in the tunnel of the movable portion.

It is another object of the present invention to provide a truck ramp wherein each of the pair of rollers are located at each of the pair of free ends of the axle.

It is another object of the present invention to provide a truck ramp wherein the pair of tracks are located between the lower surface of the fixed portion and the upper surface of the cargo portion of the pickup truck and rotatably receive the pair of rollers.

It is another object of the present invention to provide a truck ramp wherein the stop is located at the back end of the fixed portion.

It is another object of the present invention to provide a truck ramp wherein the movable portion contains a hand grip that is located at the distal end of the movable portion.

It is another object of the present invention to provide a truck ramp wherein each of the pair of tracks have an outer portion, a bottom portion, and an inner portion.

It is another object of the present invention to provide a truck ramp wherein the fixed portion can flex downward without deflecting the pair of tracks.

It is another object of the present invention to provide a truck ramp wherein the pair of tracks are displaced a distance below the lower surface of the fixed portion and forms an air space therebetween.

It is another object of the present invention to provide a truck ramp wherein the upper surface of the fixed portion has embossments located thereon.

It is another object of the present invention to provide a truck ramp wherein the upper surface of the movable portion has embossments located thereon.

It is another object of the present invention to provide a truck ramp wherein the fixed portion is prevented from longitudinal bending.

It is another object of the present invention to provide a truck ramp that further includes a pair of longitudinal beams located on the lower surface of the fixed portion and in the direction of the longitudinal axis center line of the fixed portion.

It is another object of the present invention to provide a truck ramp wherein the lateral bending of the fixed portion is prevented.

It is another object of the present invention to provide a truck ramp that further includes at least one lateral beam located on the lower surface of the fixed portion.

It is another object of the present invention to provide a truck ramp wherein the fixed portion has a right section, a center section, and a left section.

It is another object of the present invention to provide a track ramp wherein the fixed portion is restricted from any lateral and longitudinal movement within the cargo portion of the pickup truck.

It is another object of the present invention to provide a truck ramp wherein the left section has a distal side with a contour equivalent to the contour of the left wheelwell of the pickup truck.

It is another object of the present invention to provide a truck ramp wherein the right section has a distal side with a contour equivalent to the contour of the right wheelwell of the pickup truck.

It is another object of the present invention to provide a truck ramp wherein the pair of tracks are located on the pair of longitudinal beams.

It is another object of the present invention to provide a truck ramp that further includes a plurality of fasteners for securing the pair of longitudinal beams to the fixed portion.

It is another object of the present invention to provide a truck ramp that further includes cleaning apparatus for cleaning the upper surface of the movable portion when the movable portion extends from and retracts into the fixed portion.

It is another object of the present invention to provide a truck ramp wherein the cleaning apparatus includes flexible bristles.

It is another object of the present invention to provide a truck ramp that further includes sealing apparatus for sealing the air space against external elements.

It is another object of the present invention to provide a truck ramp wherein the sealing apparatus includes a flexible lip.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

FIG. 1 is a plan view of the truck ramp of the present invention installed in the cargo portion of a pickup truck that has a bottom hinged tailgate;

FIG. 3 is a cross sectional view of the present invention taken along line 3—3 in FIG. 1;

DETAILED DESCRIPTION OF THE PREFERRED EMBODIMENT

Referring now to the Figures in which like numbers indicate like parts, the truck ramp of the present invention is shown generally at 10.

As shown in FIG. 1, a pickup truck 12 has a pickup truck cab portion 12A, a pickup truck cargo portion 12B, and a pickup truck longitudinal axis center line 12C.

The pickup truck cargo portion 12B of the pickup truck 12 includes a pickup truck cargo portion bottom hinged tailgate 12BA, a pair of pickup truck cargo portion wheel wells 12BB, and a pickup truck cargo portion upper surface 12BC.

The pickup truck cargo portion bottom hinged tailgate 12BA of the pickup truck cargo portion 12B of the pickup truck 12 is swingingly mounted to the pickup truck cargo portion 12B of the pickup truck 12 by pickup truck cargo portion bottom hinged tailgate hinges 12BAA.

The pair of pickup truck cargo portion wheel wells 12BB of the pickup truck cargo portion 12B of the pickup truck 12 each have a pickup truck cargo portion wheelwell contour 12BBA.

The truck ramp 10 includes a fixed portion 14 and a movable portion 16. The movable portion 16 is stored within the fixed portion 14 and can be extended from and retracted into the fixed portion 14.

The fixed portion 14 rests within the pickup truck cargo portion 12B of the pickup truck 12 and upon the pickup truck cargo portion upper surface 12BC of the pickup truck cargo portion 12B of the pickup truck 12.

The movable portion 16 has a movable portion distal end 16A which contains a movable portion distal end hand grip opening 16C and a movable portion proximal end 16B which contains a movable portion proximal end axle chamber 16D.

Figure 6:
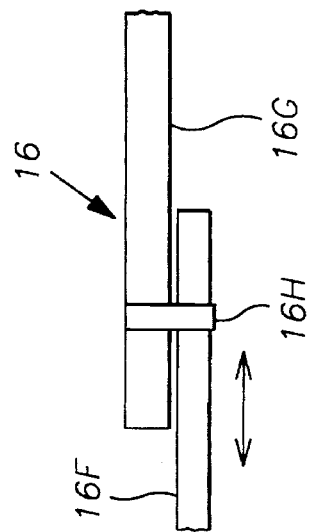
FIG. 6 is a side view of an extendable piece of the movable portion.

If the pickup truck cargo portion 12B of the pickup truck 12 is exceptionally high, then the movable portion 16 would include an extendable portion 16F. The extendable portion 16F extends from the lower surface 16G of the movable portion 16 and is held thereto by a transversely disposed strap 16H (see FIG. 6).

An axle 18, which has a axle left end 18A and a axle right end 18B, is rotationally received within the movable portion proximal end axle chamber 16D of the movable portion 16.

A right roller 20 is attached to the axle right end 18B of the axle 18 and a left roller 22 is attached to the left axle end 18A of the axle 18.

Figure 2:
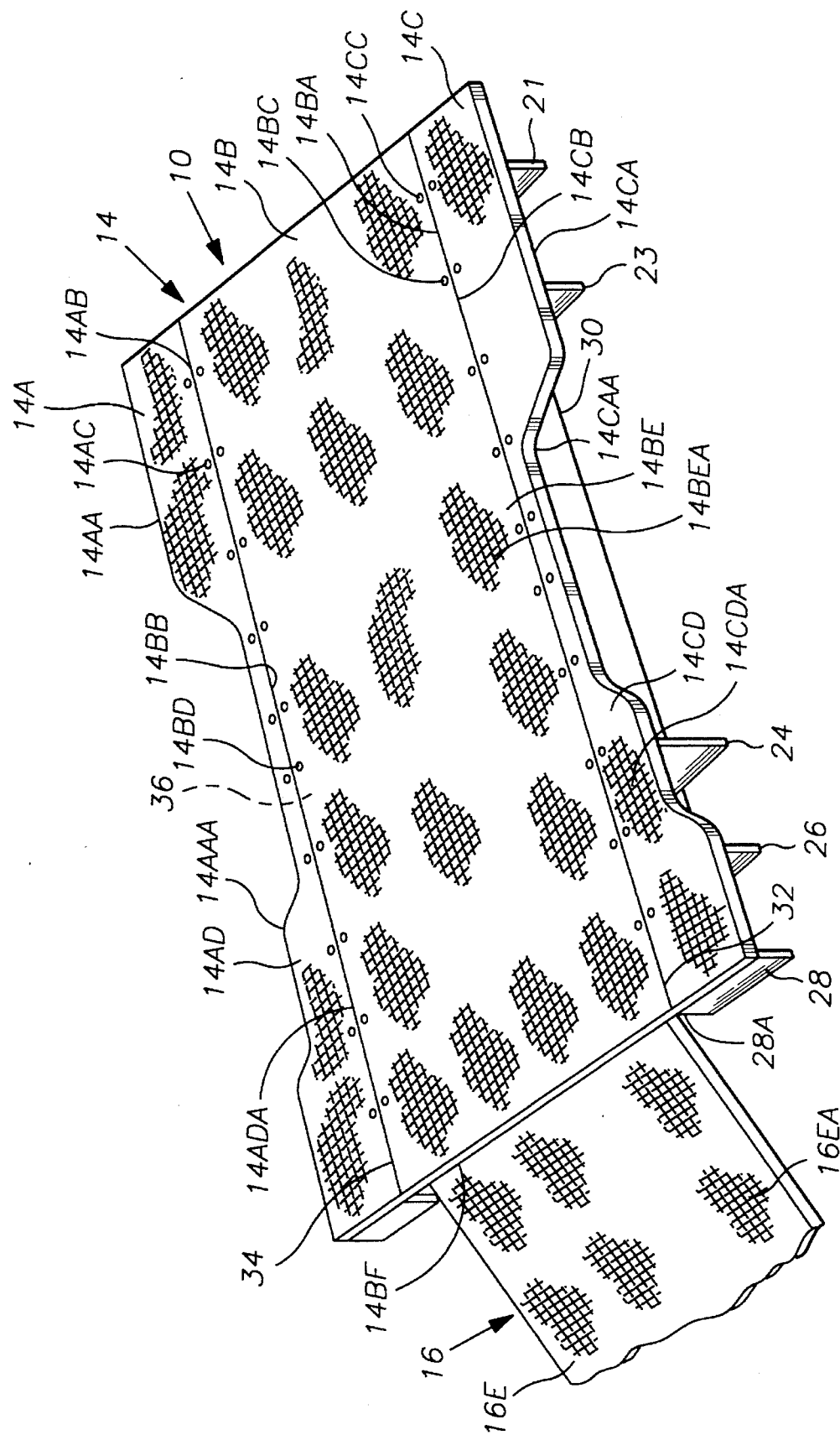
FIG. 2 is a perspective view of the present invention, shown in FIG. 1, with the movable portion in the extended position.

As can be seen in FIG. 2, the fixed portion 14 includes a fixed portion left section 14A, a fixed portion center section 14B, and a fixed portion right section 14C.

The movable portion 16 has a movable portion upper surface 16E that is covered with movable portion upper surface embossments 16EA.

The fixed portion left section 14A of the fixed portion 14 has a fixed portion left section distal side 14AA, a fixed portion left section proximal side 14AB, and a fixed portion left section upper surface 14AD.

The fixed portion left section distal side 14AA of the fixed portion left section 14A of the fixed portion 14 has a fixed portion left section distal end wheelwell contour 14AAA. The fixed portion left section upper surface 14AD of the fixed portion left side 14A of the fixed portion 14 is covered with fixed portion left section upper surface embossments 14ADA.

The fixed portion left section 14A of the fixed portion 14 is interchangeable so that a fixed portion left section 14A of the fixed portion 14 can be used wherein the fixed portion left section distal end wheelwell contour 14AAA of the fixed portion left section distal end 14AA of the fixed portion left section 14A of the fixed portion 14 can match the pickup truck cargo section wheelwell contour 12BBA of the pickup truck cargo portion wheelwell 12BB of the pickup truck cargo portion 12B of the pickup truck 12.

The fixed portion center section 14B of the fixed portion 14 has a fixed portion center section right side 14BA, a fixed portion center section left side 14BB, a fixed portion center section upper surface 14BE, and a fixed portion center section lower surface 14BE.

The fixed portion center section upper surface 14BE of the fixed portion center section 14B of the fixed portion 14 is covered with fixed portion center section upper surface embossments 14BEA.

The fixed portion right section 14C of the fixed portion 14 has a fixed portion right section distal side 14CA, a fixed portion right section proximal side 14CB, and a fixed portion right section upper surface 14CD.

The fixed portion right section distal side 14CA of the fixed portion right section 14C of the fixed portion 14 has a fixed portion right section distal end wheelwell contour 14CAA. The fixed portion right section upper surface 14CD of the fixed portion right side 14C of the fixed portion 14 is covered with fixed portion right section upper surface embossments 14CDA.

The fixed portion right section 14C of the fixed portion 14 is interchangeable so that the fixed portion right section distal end wheelwell contour 14CAA of the fixed portion right section distal end 14CA of the fixed portion right section 14C of the fixed portion 14 can match the pickup truck cargo section wheelwell contour 12BBA of the pickup truck cargo portion wheelwell 12BB of the pickup truck cargo portion 12B of the pickup truck 12.

Since the fixed portion right section distal end wheelwell contour 14CAA of the fixed portion right section distal end 14CA of the fixed portion right section 14C of the fixed portion 14 and the fixed portion left section distal end wheelwell contour 14AAA of the fixed portion left section distal end 14AA of the fixed portion left section 14A of the fixed portion 14 match the pickup truck cargo section wheelwell contour 12BBA of the pickup truck cargo portion wheelwell 12BB of the pickup truck cargo portion 12B of the pickup truck 12, therefore the fixed portion 14 is restricted from any lateral or longitudinal movement within the pickup truck cargo portion 12B of the pickup truck 12 without the need for fasteners.

The presence of the fixed portion left section upper surface embossments 14ADA of the fixed portion left section upper surface 14AD of the fixed portion left section 14A of the fixed portion 14, and the presence of the fixed portion central section upper surface embossments 14BEA of the fixed portion central section upper surface 14BE of the fixed portion center section 14B of the fixed portion 14, and the presence of the fixed portion right section upper surface embossments 14CDA of the fixed portion right section upper surface 14CD of the fixed portion right section 14C of the fixed portion 14, prevent cargo placed in the pickup track cargo portion 12B of the pickup truck 12 from any undue movement during use.

The fixed portion center section right side 14BA of the fixed portion center section 14B of the fixed portion 14 mates with the fixed portion right section proximal side 14CB of the fixed portion right section 14C of the fixed portion 14 and forms a right joint area 32.

The right joint area 32 is supported by and affixed to a right longitudinal beam 30 by a plurality of fixed portion center section right side fasteners 14BC and a plurality of fixed portion right section proximal side fasteners 14CC.

The fixed portion center section left side 14BB of the fixed portion center section 14B of the fixed portion 14 mates with the fixed portion left section proximal side 14AB of the fixed portion left section 14A of the fixed portion 14 and forms a left joint area 34.

The left joint area 34 is supported by and affixed to a left longitudinal beam 36 by a plurality of fixed portion center section left side fasteners 14BE and a plurality of fixed portion left section proximal side fasteners 14AC.

The right longitudinal beam 30 and the left longitudinal beam 34 prevent the fixed portion 14 from bending in the direction of the longitudinal axis center line 12C of the pickup truck 12.

The combination formed by the fixed portion right section 14A of the fixed portion 14, and the fixed portion center section 14B of the fixed portion 14, and the fixed portion left section 14C of the fixed portion 14 is prevented against bending in the lateral direction by a rear lateral beam 21, a rear intermediate lateral beam 23, a forward intermediate lateral beam 24, and a forward lateral beam 26.

A front stop lateral beam 28 is disposed at the rear of the fixed portion 14 and contains a front stop lateral beam opening 28A through which the movable portion 16 can extend and retract. A flexible lip 42 covers the front stop lateral beam opening 28A contained in the front stop lateral beam 28 so that the front stop lateral beam opening 28A contained in the front stop lateral beam 28 is covered while the movable portion 16 extends from and retracts into the fixed portion 14.

Figure 4:
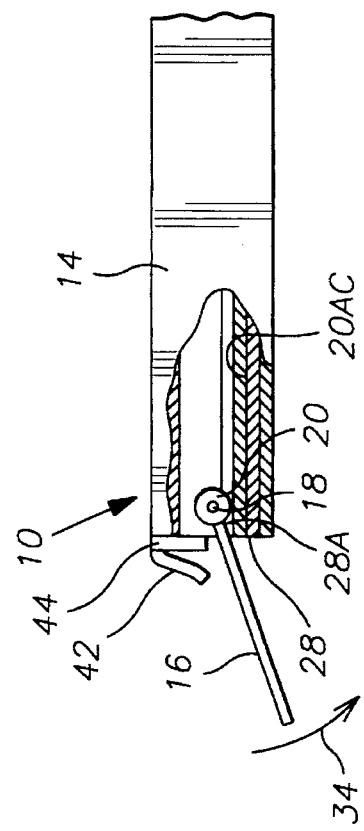
FIG. 4 is a partial cutaway side view of the present invention showing the movable portion in the initial extended position.
Figure 5:
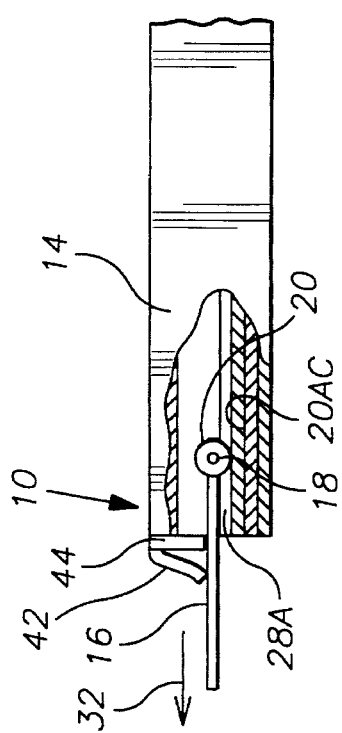
FIG. 5 is a partial cutaway side view of the present invention showing the movable portion in the final extended position.

The movable portion 16 is extended from and retracted into the fixed portion 14 by a means best seen in FIGS. 3, 4, and 5.

A right track 20A has a right track outer portion 20AA, a right track bottom portion 20AB, and a right track inner portion 20AC. The right track 20A is attached to the right longitudinal beam 30 at the right track bottom portion 20AB of the right track 20A.

The right track 20A is displaced below the fixed portion center section lower surface 14BF of the fixed portion center section 14B of the fixed portion 14 and forms a right air space 38 therebetween.

A left track 22A has a left track outer portion 22AA, a left track bottom portion 22AB, and a left track inner portion 22AC. The left track 22A is attached to the left longitudinal beam 36 at the left track side portion 22AB of the left track 22A.

The left track 22A is displaced below the fixed portion center section lower surface 14BF of the fixed portion center section 14B of the fixed portion 14 and forms a left air space 40 therebetween.

The presence of the right air space 38 and the presence of the left air space 40 allow the fixed portion central section 14B of the fixed portion 14 to deflect downwardly, when cargo is placed on the fixed portion center section upper surface 14BE of the fixed portion center section 14B of the fixed portion 14, without deflecting the right track 20A and the left track 22A.

The right air space 38 and the left air space 40 assure the complete operation of the right track 20A and the left track 23A regardless of the load placed in the pickup truck cargo portion 12B of the pickup truck 12.

The left roller 22, that is disposed at the axle left end 18A of the axle 18, rolls freely within the left track 22A. The right roller 20, that is disposed at the axle right end 18B of the axle 18, rolls freely within the right track 20A.

Flexible bristles 44 clean the movable portion upper surface 16E of the movable portion 16 when the movable portion 16 extends from and retracts into the fixed portion 14.

In operation, the movable portion hand grip opening 16C of the movable portion 16 is gabbed by the hand of a user. The user then pulls the movable portion 16 outwardly from the fixed portion 14, through the front stop lateral beam opening 28A contained in the front stop lateral beam 28, in a direction indicated by initial direction arrow 32.

This movement continues until the right roller 20 and the left roller 22 meet the front stop lateral beam 28. At this point, since the movable portion 16 can no longer move in the direction of the longitudinal axis center line 12C of the pickup truck 12, and since the right roller 20 and the left roller 22 are rotatably mounted within the right track 20A and the left track 22A, respectively, the movable portion 16 is pivoted downwardly in a direction indicated by terminal direction arrow 34 until the movable portion distal end 16A of the movable portion 16 rests on the ground.

It will be understood that each of the elements described above, or two or more together, may also find a useful application in other types of constructions differing from the types described above.

While the invention has been illustrated and described as embodies in a truck ramp, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

I claim:

1. A truck ramp (10) removably mounted inside a cargo portion (12B) of a pickup truck (12), the truck ramp comprising:

(A) a fixed portion (14) which comprises a fixed portion left section (14A), a fixed portion center section (14B), and a fixed portion right section (14C);

the fixed portion left section (14A) comprising a fixed portion left section distal end (14AA), a fixed portion left section proximal end (14AB), a fixed portion left section upper surface (14AD), and a fixed portion left section distal end wheel well contour (14AAA) complimentary in configuration to a pickup truck cargo portion wheel well contour (12BBA);

the fixed portion center section (14B) comprising a fixed portion center section right side (14BA), a fixed portion center section left side (14BC), a fixed portion center section upper surface (14BE), and a fixed portion center section lower surface (14BF);

the fixed portion right section (14C) comprising a fixed portion right section distal end (14CA), a fixed portion right section proximal end (14CB), a fixed portion right section upper surface (14CD), and a fixed portion right section distal end wheel well contour (14CAA) complimentary in configuration to a pickup truck cargo portion wheel well contour (12BBA);

the fixed portion right section (14C) being securely fastened along the fixed portion right section proximal end (14CB) to a top side of a right longitudinal beam (30), the fixed portion center section (14B) being securely fastened along the fixed portion center section right side (14BA) to the top side of the right longitudinal beam (30), the fixed portion center section (14B) being securely fastened along the fixed portion center section left side (14BC) to a top side of a left longitudinal beam (36), and the fixed portion left section (14A) being securely fastened along the fixed portion left section proximal end (14AB) to the top side of the left longitudinal beam (36);

the right longitudinal beam (30) having a right track (20A) securely fastened therein consisting of a right track outer portion (20AA) securely fastened to a right track inner portion (20AC) having a right track bottom portion (20AB) therebetween, the right track bottom portion (20AB) being securely fastened to an inner surface of a bottom of the right longitudinal beam (30), the left longitudinal beam (36) having a left track (22A) securely fastened therein consisting of a left track outer portion (22AA) securely fastened to a left track inner portion (22AC) having a left track bottom portion (22AB) therebetween, the left track bottom portion (22AB) being securely fastened to an inner surface of a bottom of the left longitudinal beam (36);

a first rear lateral beam (21) being positioned at a rear location on the ramp and securely fastened to the fixed portion left section (14A) at a lower surface thereof, a first rear intermediate lateral beam (23) being positioned between the first rear lateral beam (21) and the fixed portion left section distal end wheel well contour (14AAA) and securely fastened to the fixed portion left section (14A) at a lower surface thereof, a first front stop lateral beam (28) being positioned at a front location on the ramp and securely fastened to the fixed portion left section (14A) at a lower surface thereof, a first front intermediate lateral beam (24) being positioned between the first front stop lateral beam (28) and the fixed portion left section distal end wheel well contour (14AAA) and securely fastened to the fixed portion left section (14A) at a lower surface thereof, and a first front lateral beam (26) being positioned between the first front stop lateral beam (28) and the first front intermediate lateral beam (24) and securely fastened to the fixed portion left section (14A) at a lower surface thereof;

a second rear lateral beam (21) being positioned at a rear location on the ramp and securely fastened to the fixed portion right section (14C) at a lower surface thereof, a second rear intermediate lateral beam (23) being positioned between the second rear lateral beam (21) and the fixed portion right section wheel well contour (14CAA) and securely fastened to the fixed portion right section (14C) at a lower surface thereof, a second front stop lateral beam (28) being positioned at a front location on the ramp and securely fastened to the fixed portion right section (14C) at a lower surface thereof, a second front intermediate lateral beam (24) being positioned between the second front stop lateral beam (28) and the fixed portion right section distal end wheel well contour (14CAA) and securely fastened to the fixed portion right section (14C) at a lower surface thereof, and a second front lateral beam (26) being positioned between the second front stop lateral beam (28) and the second front intermediate lateral beam (24) and securely fastened to the fixed portion right section (14C) at a lower surface thereof; and, (B) a movable portion (16) having a movable portion chamber (16D) therein which is slidably mounted on the right track (20A) and the left track (22A), the movable portion (16) comprising a movable portion distal end (16A) and a movable portion proximal end (16B), a movable portion upper surface (16E) and a movable portion lower surface (16G), the movable portion chamber (16D) having an axle (18) rotatably mounted therein comprising an axle left end (18A) having a left roller (22) rotatably mounted thereon and an axle right end (18B) having a right roller (20) rotatably mounted thereon, the left roller (22) rolling upon and within the left track (22A) and the right roller (20) rolling upon and within the right track (20A), such that the movable portion has a retracted storage position and an extended ramp position.

2. The truck ramp (10) as described in claim 1, wherein the fixed portion left section upper surface (14AD) has a plurality of fixed portion left section upper surface embossments (14ADA) thereon functioning as an anti-slipping means.

3. The truck ramp (10) as described in claim 1, wherein the fixed portion center section upper surface (14BE) has a plurality of fixed portion center section upper surface embossments (14BEA) thereon functioning as an anti-slipping means.

4. The truck ramp (10) as described in claim 1, wherein the fixed portion right section upper surface (14CD) has a plurality of fixed portion right section upper surface embossments (14CDA) thereon functioning as an anti-slipping means.

5. The truck ramp (10) as described in claim 1, wherein the fixed portion center section (14B) has a flexible lip (42) securely fastened at a frontal position to the fixed portion center section (14B) which functions to remove debris from the movable portion upper surface (16E).

6. The truck ramp (10) as described in claim 5, wherein the flexible lip (42) has a plurality of flexible bristles securely fastened thereto which function to facilitate removal of debris from the movable portion upper surface (16E).

7. The truck ramp (10) as described in claim 1, wherein the movable portion (16) has a movable portion hand grip opening (16C) positioned at a front end thereof.

8. The truck ramp (10) as described in claim 1, wherein the movable portion upper surface (16E) has a plurality of movable portion upper surface embossments (16EA) thereon functioning as an anti-slipping means.

9. The truck ramp (10) as described in claim 1, wherein the movable portion (16) has a movable portion extended portion (16F) slidably attached thereto by a movable portion strap (16H).

* * * * *